May 18, 1926.

A. A. MANSURZADAH

METHOD OF MARKING GLASS

Filed July 23, 1925

1,585,555

INVENTOR.
A. A. Mansurzadah
BY
Drury, Strong, Townsend & Loften
ATTORNEYS.

Patented May 18, 1926.

UNITED STATES PATENT OFFICE.

1,585,555

ABDUL AZIZ MANSURZADAH, OF OAKLAND, CALIFORNIA.

METHOD OF MARKING GLASS.

Application filed July 23, 1925. Serial No. 45,701.

This invention relates to a new and improved method of marking glass and the like, particularly for the providing of a trade mark or other distinguishing mark thereon. My invention relates particularly to a process of so treating the surface of glass, precious stones, etc., as to modify the hydroscopic properties thereof in a manner rendering such treated surfaces visible when moisture is condensed thereon, as by breathing on the surface treated. I am aware that this method of marking glass is not broadly new, and I am therefore not claiming such invention broadly herein. It is the primary object of my invention to provide an improved method of marking glass and like surfaces in a manner rendering such mark more permanent than has been done heretofore and without in any manner injuring or impairing such surfaces.

The surfaces of glass and the like have been heretofore marked by various means rendering the mark visible upon the condensation of moisture thereon. Such marks, however, have been only of a temporary character, ordinarily being a liquid which dries on the surface and comes off readily when the surface is polished or subjected to washing. My invention pertains to the marking of these surfaces wherein a chemical agent applied to the surface reacts with certain of the constituents of the glass and forms a chemical change in the hydroscopic properties of the treated surface without in any manner impairing or injuring such surface.

I have hereinafter disclosed my preferred method of carrying out my invention, but it will be understood that such description is not to be construed as strictly defining or limiting the scope of the invention, the claims appended to this specification being relied upon for that purpose.

Referring to the figures in the accompanying drawing.

Figure 1:
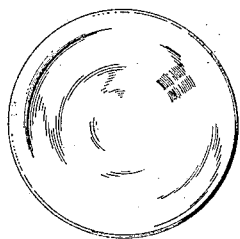
Fig. 1 shows a lens as it normally appears when marked by any improved method.
Figure 2:
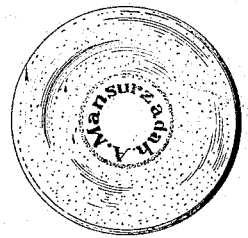
Fig. 2 shows the same lens as it appears when moisture is condensed on the treated surface thereof, as by breathing thereon.

In carrying out my improved process, I first provide a solution of the treating agent in one of the following manners. The agent which I use most preferably and which forms the most permanent mark is chromium or any of its compounds, such as chromic compounds, chromous compounds, chromic acid, and dichromic acid. A solution of sodium dichromate ($Na_2Cr_2O_7$) or potassium dichromate ($K_2Cr_2O_7$) forms the most preferable treating agent. I apply this treating agent to the surface of the glass by means of a pen, brush, rubber stamp, or other convenient means. The treated surface is thereafter allowed to dry and reduce or oxidize in ordinary temperature, exposed to the sun, strong artificial light, or heated to about 200° F. After this treatment, it will be found that the mark will normally be entirely invisible on the glass but by subjecting the surface to slight moisture, as by breathing thereon, the mark will become plainly visible and remain so until the moisture disappears, the mark entirely disappearing with the moisture.

As has been above stated, the mark applied by my improved process remains on the treated surface for a considerable period of time, the same being substantially permanent. The reason for this is that the treating agent forms a chemical reaction with certain of the constituents of the glass, such as silica, therein, and forms a permanent change in the hydroscopic properties thereof, whereby the moisture collects on the treated surface in a form more or less concentrated than on the untreated surface. The treatment, therefore, involves a chemical change in the surface of the glass instead of merely drying of the chemical substance on the surface as has been done heretofore.

Chromium and other compounds do not readily take to the surface of glass and like surfaces and for this reason I preferably proceed as follows: I mix the chromium or chromium compound with glycerine, fatty acids, or soap (soluble or insoluble). A solution made of these ingredients is applied to the glass more easily and the ingredients furthermore aid in the drying, reducing or oxidizing thereof.

While as above stated, chromium and its compounds are preferably used as the treating agent in my improved process, nevertheless, I have found that a mark which will remain for quite sometime can be made by using the following solution: This solution comprises a preparation of soaps (soluble or insoluble) with alcohol or sugar. This treatment acts on the glass in a manner similar to that above described and results in a mark which will remain for a considerable period of time. This solution is applied in the manner above described, and in both cases the solution is thoroughly dried and reduced or oxidized in completing the process.

Having thus described my invention, what I claim and desire to secure by Letters Patent is—

1. A method of marking glass and the like consisting of chemically modifying the hydroscopic properties of a portion of the surface thereof by applying thereto a chemical agent containing chomium in solution which reacts chemically with certain of the glass constituents to modify the hydroscopic properties of the treated surface, and thereafter exposing the agent to heat or light to complete the chemical reaction and the marking operation.

2. A method of marking glass and the like consisting of chemically modifying the hydroscopic properties of a portion of the surface thereof by applying thereto a chemical agent containing chromium, and thereafter treating the same in a manner causing the agent to react chemically with certain of the glass constituents to modify the hydroscopic properties of the treated surface.

3. A method of marking glass and the like consisting of chemically modifying the hydroscopic properties of a portion of the surface thereof by applying thereto a chemical agent in containing chromium in solution with means rendering the chromium more applicable to such surface, and thereafter treating the same in a manner causing the agent to react chemically with certain of the glass constituents to modify the hydroscopic properties of the treated surface.

ABDUL AZIZ MANSURZADAH.